US010724920B2

(12) United States Patent
Eberlein et al.

(10) Patent No.: US 10,724,920 B2
(45) Date of Patent: Jul. 28, 2020

(54) METHOD OF ANALYZING A LIGHT DISTRIBUTION OF A VEHICLE HEADLIGHT

(71) Applicant: Lumileds LLC, San Jose, CA (US)

(72) Inventors: Yul Jens Eberlein, Aachen (DE); Maximilian Heithoff, Duesseldorf (DE); Lukas Kuepper, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/465,961

(22) PCT Filed: Nov. 27, 2017

(86) PCT No.: PCT/EP2017/080501
§ 371 (c)(1),
(2) Date: May 31, 2019

(87) PCT Pub. No.: WO2018/099852
PCT Pub. Date: Jun. 7, 2018

(65) Prior Publication Data
US 2020/0025647 A1 Jan. 23, 2020

(30) Foreign Application Priority Data
Dec. 1, 2016 (EP) .................................... 16201740

(51) Int. Cl.
*G01M 11/06* (2006.01)
*B60Q 1/04* (2006.01)

(52) U.S. Cl.
CPC ........... *G01M 11/064* (2013.01); *B60Q 1/045* (2013.01)

(58) Field of Classification Search
CPC ... G01M 11/064; G01M 11/065; B60Q 1/045; G06T 2207/10024; G06T 2207/20076; G06T 7/0004
See application file for complete search history.

(56) References Cited

U.S. PATENT DOCUMENTS 5,170,220 A * 12/1992 Matsumoto .......... G01M 11/064
356/121
5,896,085 A 4/1999 Mori et al.
8,422,004 B1 4/2013 Ekladyous et al.

FOREIGN PATENT DOCUMENTS

DE 102012209927 A1 12/2013

OTHER PUBLICATIONS

EPO as ISA, PCT/EP2017/080501 filed Nov. 27, 2017, "International Search Report and Written Opinion", dated Jan. 10, 2018, 17 pages.

(Continued)

*Primary Examiner* — Kevin Quarterman

(57) ABSTRACT

The invention describes a method of analyzing a light distribution of a vehicle headlight. The method determines a cutoff line based on a brightness distribution within a column of an image of the light distribution, the column being perpendicular to a horizon in the image. The method compares the cutoff line with a reference cutoff line and uses the deviations revealed by such comparison to attribute a reduced quality of the light distribution to a particular one of several possible causes. The invention further describes a vehicle headlight analyzer which is arranged to perform the method. The invention finally describes a corresponding computer program product comprising code for executing the method on a processing device.

14 Claims, 8 Drawing Sheets

(56) References Cited

OTHER PUBLICATIONS

Extended European Search Report, European Application No. 16201740.4, 12 pages.
Henning Kiel, "Bewertung von Kraftfahrzeugscheinwerfern mit Lichtsimulation", May 11, 2012 (May 11, 2012), pp. 1-199, XP055375285 (p. 6 English Abstract).
Joe J. Lones, et al, Practical measure of headlamp beam alignment in vehicle assembly, SPIE—International Society for Optical Engineering. Proceedings, vol. 6288, Aug. 31, 2006 (Aug. 31, 2006), XP055375137, US.
Michael Sivak et al, "Visual Aiming of European and U.S. Low-Beam Headlamps", SAE Technical Paper Series, vol. 1, Feb. 24, 1992 (Feb. 24, 1992), 32 pgs, XP055375848, US.
Tomasz Targosinski, "Importance of Cut-Off Line in Automotive Headlamps Aiming", Journal of Kones Internal Combustion Engines, vol. 19, No. 3, Jan. 1, 2012 (Jan. 1, 2012_, pp. 469-476, XP055375252.

\* cited by examiner

METHOD OF ANALYZING A LIGHT DISTRIBUTION OF A VEHICLE HEADLIGHT

CROSS-REFERENCE TO RELATED APPLICATIONS

The present application is a § 371 application of International Application No. PCT/EP2017/080501 filed on Nov. 27, 2017 and titled "METHOD OF ANALYZING A LIGHT DISTRIBUTION OF A VEHICLE HEADLIGHT," which claims the benefit of European Patent Application No. 16201740.4 filed on Dec. 01, 2016. International Application No. PCT/EP2017/080501 and European Patent Application No. 16201740.4 are incorporated herein.

FIELD OF THE INVENTION

The invention relates to a method of analyzing a light distribution of a vehicle headlight. The invention further relates to a vehicle headlight analyzer adapted to analyze a light distribution of a vehicle headlight. The invention finally relates to a corresponding computer program product.

BACKGROUND OF THE INVENTION

Quality of light emitted by a vehicle headlight is important with respect to road safety. Brightness and light distribution may depend on quality of the light source, quality of imaging optics, absolute and/or relative positioning of the imaging optics or the headlight and relative positioning of the light source with respect to the imaging optics. Especially the light distribution on the road or street is essential for a driver of a vehicle to recognize dangers as soon as possible, but without glare of the oncoming traffic. There are thus a number of legal regulations describing quality criteria of light sources used in vehicle headlights (e.g. Economic Commission for Europe (ECE) Regulation (R) 37 in Europe) and regarding the light distribution of a vehicle headlight comprising such a light source (e.g. ECE R112 in Europe). Both regulations mentioned above are part of the Agreement Concerning the Adoption of Uniform Technical Prescriptions for Wheeled Vehicles, Equipment and Parts which can be fitted and/or be used on Wheeled Vehicles and the Conditions for Reciprocal Recognition of Approvals Granted on the Basis of these Prescriptions. These regulations refer to the performance of a vehicle headlight or a light source comprising the vehicle headlight at the time of sale.

The dissertation of Henning Kiel "Bewertung von Kraftfahrzeugscheinwerfern mit Lichtsimulation" defended on 11 May 2015 at the university of Ilmenau, Germany gives a systematic assessment in particular of the definition of the bright/dark cutoff line of a low beam light as given in these regulations. The dissertation addresses the challenges and deficiencies of the manual aiming of low beam headlights as still largely employed in practice and proposes automatic methods based on light measurements and mathematical algorithms to arrive at more reproducible results and allowing full automation of aiming tasks. Similar issues are addressed also in the article "Tomasz Targosinski: Importance of Cut-Off Line in Automotive Headlamps Aiming. Journal of KONES Powertrain and Transport, Vol. 19, No. 3, 2012" and in the report "Michael Sivak et al.: Visual Aiming of European and U.S. Low-Beam Headlamps. Report No. UMTRI-91-34, University of Michigan, November 1991" (the latter also published under SAE TECHNICAL PAPER SERIES, vol. 1, 24 Feb. 1992, US ISSN: 0148-7191, DOI: 10.4271/920814).

In view of aging of light sources, misalignment of light sources and potential damages of, for example, imaging optics there is a need to check quality of light and to give advice to a driver to keep lighting quality of a vehicle headlight in line with the defined criteria over lifetime of the vehicle.

SUMMARY OF THE INVENTION

It is an object of the present invention to provide an improved method of analyzing a light distribution of a vehicle headlight.

According to a first aspect a method of analyzing a light distribution of a vehicle headlight is provided. The method comprises the steps of:
  detecting an image of the light distribution,
  determining a brightness of at least a part of pixels of the image within a column of the image,
  determining a probability of a cutoff within the column based on a relative change of brightness between neighboring pixels of the image within the column, wherein the probability is the higher the higher the relative change of brightness is.

Placement and contrast of the cutoff line of a vehicle headlight are essential quality criteria of the light distribution provided by the vehicle headlight. The placement of the cutoff line on the street (or road) determines the range of the vehicle headlight as well as potential glare of oncoming traffic. In addition, contrast of the cutoff line (meaning is there a sharp or fuzzy transition between dark and bright areas) is important with respect to visibility and glare as well. ECE R112 provides, for example, in chapter 6 (illumination) a detailed description of quality criteria and boundary conditions for vehicle headlights or headlamps which have to be fulfilled in this respect (see ECE R112, 9 Jan. 2013, p. 14-21). Perception of the light distribution of the vehicle headlight on the street by means of the human eye determines human perception of the position of the cutoff on the street. It is therefore essential to adapt a machine based analysis of the light distribution and especially of cutoff line determination to the perception of a human being. Several approaches may be used in order to determine a cutoff. One approach may be to determine the biggest slope in an intensity distribution, for example, within a column of the image of the light distribution. A column of the image is perpendicular to a horizon within the image. Experiments have shown that the cutoff perceived by a human being and a cutoff determined based on the slope differ by around 1%, i.e., by around $0.57°=\arctan(0.01)$. Determining a probability of a cutoff by means of the relative change of brightness between neighboring pixels within a column of the image shows a nearly perfect match with human perception. The human eye is more sensitive with respect to changes at low brightness as compared to changes at high brightness, i.e., a change from the dark to low brightness is more pronouncedly perceived than the same brightness change from brightness to even stronger brightness (see FIG. 8).

The machine based analysis may, depending on the intended lighting pattern and the intended cutoff, further comprise a similar analysis by using neighboring pixels within a row of the image (the rows being perpendicular to the columns). The image may, for example, in a first step be analyzed along various columns. If there are columns in which a cutoff cannot be determined with sufficient probability all or a part of the rows may be analyzed in a second step for finding a cutoff in the row(s) with a probability above a given threshold.

The method preferably comprises the further step of:
assigning the probability of the cutoff to at least one of the neighboring pixels of the image within the column.

The probability of the cutoff may, for example, be assigned to the pixel n when the relative brightness difference between pixel n and pixel n−1 is determined. Assigning the probability of the cutoff to at least one of the neighboring pixels of the column enables determination of a probability distribution across different pixels within the column of the image. This may provide an improved measure of the probability of the cutoff. The pixels within the column of the image may be measured by means of an array of light detectors like, for example, a charge coupled device (CCD) or a color sensitive digital camera. One column within the array may, for example, correspond to one column (or a part thereof) of the image of the light distribution.

The method may comprise the further step of:
determining a cutoff line based on the probability of the cutoff within a multitude of columns of the image.

The cutoff line may be determined by means of the pixels with the highest probability of a cutoff within the multitude of columns. Alternatively or in addition, in each column a range of pixels may be determined in which the cutoff most likely happens. The range of pixels may be determined by means of the probability of the cutoff assigned to the respective pixel. The probability assigned to a pixel may further be used to provide a weight factor which is used to determine the cutoff line. The cutoff line may in this case, for example, be determined by taking into account the range in which the cutoff most likely happens within each column and the probability distributions within the ranges of the respective columns. Furthermore, the cutoff line may be determined by taking into account the expected shape of the cutoff line (see, for example, FIG. 2).

The method may, for example, comprise the further steps of:
determining a first part of the cutoff line,
determining a second part of the cutoff line, and
determining a junction point of the first part of the cutoff line and the second part of the cutoff line.

The first part of the cutoff line is parallel to a horizon. The second part of the cutoff line encloses an angle with the horizon such that the first part of the cutoff line and the second part of the cutoff line touch each other in the junction point. The first part, the second part and the junction point correspond to an expected shape of the cutoff line. The cutoff line may be determined taking into account the expected shape, taking into account the probabilities of the cutoff and the probability distributions within each column at the same time. A further weight may be assigned to the pixels or to a range of the pixels in order to determine the cutoff line in view of the expected shape of the cutoff line. The expected shape of the cutoff line may be specific for the respective vehicle or, to be more precise, for the type of vehicle headlight comprised by a specific vehicle.

The image of the light distribution may be detected on a screen in a horizontal angular range of at least 2%, preferably at least 5%, and most preferably at least 10% on either side of a vertical reference line.

The reference line or more precisely the vertical reference line may, for example, be a line perpendicular to the horizon through the crossing point of the borderlines of the straight street at the horizon. The horizontal angular range is arranged parallel to the horizon. In addition there is a vertical angular range which is perpendicular to the horizon. The vertical angular range may comprise a range of at least 1% in both directions perpendicular to the horizon. The vertical angular range may depend on the expected cutoff line (angle enclosed with the horizon). The vertical angular range may be 2%, preferably 4%, most preferably at least 6% in both directions perpendicular to the horizon. The horizon is comprised within the vertical angular range. Experiments have shown that a horizontal angular range of at least +/−2% around the vertical reference line is sufficient to characterize the quality of a light distribution. This angular range enables detection of a cutoff line by means of the probability of a cutoff within a multitude of columns of the image (e.g. 30 columns per 2% angular range).

The method comprises the further steps of:
comparing the cutoff line with a reference cutoff line, and
determining a quality of the light distribution characterized by the first part of the cutoff line, the second part of the cutoff line and the crossing point by means of the comparison.

A measure may be provided indicating the likelihood of local deviations from the reference cutoff line. The reference cutoff line may be the same as the cutoff line expected for the vehicle headlight at analysis. Alternatively, the reference cutoff line may, for example, be shifted in horizontal and/or vertical direction in comparison to the expected cutoff line. The likelihood may be determined within each column (and optionally within one or more rows) by means of the probability distribution of the probabilities assigned to the pixels within the column and especially the determined range in which the cutoff most likely happens.

The method may comprise the further step of:
determining by means of a characterization of the cutoff line whether a reduction in quality of the light distribution is caused by a light source of the vehicle headlight, or an optical imaging device of the vehicle headlight, or a relative position of the light source with respect to the optical imaging device.

Global deviations of the determined cutoff line from the reference cutoff line may be caused by a bad or degrading light source, a misalignment of the light source with respect to the optical imaging device or a misalignment of the optical imaging device or the headlight comprising the optical imaging device with respect to a reference alignment. The headlight of, for example, a motorbike may be arranged too low or too high. The headlights of a car may, for example, be arranged too low, too high or may be misaligned with respect to each other.

The kind of global deviations may be used in order to differentiate between the light source and, for example, misalignment as reason for a bad light distribution. Furthermore, color temperature and distribution of color temperature of the light distribution may be determined in order to differentiate between the light source, the optical imaging device and/or the positioning of the light source. Especially local deviations of the determined cutoff line from the reference cutoff line may be used in order to determine degradation of the optical imaging device. The optical imaging device may, for example, be dirty or damaged.

The method may comprise the further step of:
determining a light distribution on a street based on the image of the light distribution.

The method may especially comprise the further step of:
determining a three dimensional light distribution on the street simulating a driver perspective of a driver of a vehicle comprising the vehicle headlight based on the image of the light distribution.

A precise measurement of the intensity distribution and corresponding data processing in order to determine the cutoff line as described above enables a simulation of the light distribution on the street or of the three dimensional light distribution with sufficient accuracy. Furthermore, color temperature and/or color coordinates of the pixels of the image may be used to provide a realistic simulation of the light distribution. Visualization of the light distribution in either a two-dimensional (birds-eye-view) or even a three-dimensional (drivers view) enables to present the drawbacks of the light distribution. A driver of a vehicle can recognize potential dangers which may be caused by inadequate lighting by means of the light distribution provided by the vehicle headlight. The analysis and visualization may be specific with respect to the lighting mode provided by the vehicle headlight (low beam, high beam, fog light etc.). The method may further enable automatic detection of the lighting mode in order to determine a suitable expected cutoff line and reference cutoff line in an automatic way.

The method may comprise the further step of:
presenting alternative configurations of the headlight with an improved light distribution, wherein the alternative configurations are chosen out of the group of selecting an alternative light source of the vehicle headlight, an alternative positioning of the vehicle headlight, an alternative optical device of the vehicle headlight, and combinations thereof.

The determined light distribution may be compared with alternative light distributions which can be provided, for example, with a correct alignment of the headlight or the corresponding optical imaging device (reflector, imaging arrangement etc.) with respect to the vehicle or the headlights relative to each other in case of, for example, a car. Alternatively or in addition, a light distribution may be presented showing the effect of an improved light source or even of a new headlight. Visualization of the presented alternative configuration by means of simulations of two-dimensional or three-dimensional light patterns may help a driver of a vehicle to recognize advantages of alternative headlight configurations. The alternative configurations may be determined based on information of the type of vehicle and type of headlight which may be provided as input parameters or alternatively in an automatic way by determining the type of vehicle and type of the headlight by means of the measured light distribution. The alternative configurations may be provided by means of a local or non-local database.

According to a further aspect a vehicle headlight analyzer is provided. The vehicle headlight analyzer comprises
an image sensor being arranged to detect an image of a light distribution of a vehicle headlight,
an evaluation device being adapted to determine a brightness of at least a part of pixels of the image within a column of the image, the evaluation device being further adapted to determine a probability of a cutoff within the column based on a relative change of brightness between neighboring pixels of the image within the column, wherein the probability is the higher the higher the relative change of brightness is.

The vehicle headlight analyzer may be a single device comprising one or more processors or processing devices and corresponding memories or memory devices. The vehicle headlight analyzer may alternatively be a distributed arrangement. The image sensor which may optionally be arranged to perform some preprocessing may, for example, be arranged in a local workshop. This local arrangement may be connected by means of a wired or wireless connection (e.g. via the Internet) to a server comprising the evaluation device or at least a part of the evaluation device.

The description provided with respect to the method of analyzing a light distribution also applies to the vehicle headlight analyzer.

The vehicle headlight analyzer may comprise an optical device, wherein the optical device is adapted to project the image on the image sensor. The optical device may comprise a lens or arrangement of lenses to project light emitted by the vehicle headlight directly on the image sensor. The image sensor may, for example, be a flat charge coupled device (CCD) comprising an array of photosensitive cells which are arranged to detect the image of the light distribution on the CCD. Alternatively, other arrangements of photodetectors (e.g. photo diodes) may be used. The vehicle headlight analyzer may in this case be a very compact unit which can, for example, be arranged at various reference positions directly in front of the headlight. Measuring a first light distribution emitted by means of a first headlight of a car at a first reference position and a second light distribution of a second headlight of the car at a second reference position may enable determination of the common light distribution of both headlights on the street. The defined reference positions enable calculation of the common light distribution and, for example, the cutoff line of the arrangement of highlights. The vehicle headlight analyzer may alternatively be arranged such that light emitted by two headlights of, for example, a car are simultaneously received by means of the optical device and projected on the image sensor. The vehicle headlight analyzer may, for example, be arranged to determine whether there is a misalignment of the vehicle headlight analyzer with respect to the vehicle (e.g. car).

The vehicle headlight analyzer may comprise a screen on which the image of the light distribution is projected, wherein the image sensor is adapted to detect the image on the screen. The screen may, for example, be a flat screen arranged 10 m or 25 m away from the vehicle headlight. The image sensor may, for example, be a camera adapted to observe an image of the light distribution projected on the flat screen.

The vehicle headlight analyzer may in this case comprise an optical device, wherein the optical device is adapted to project the image on the screen. The optical device may comprise one or more optical elements like, for example, lenses projecting light emitted by the vehicle headlight on the preferably flat screen which might be arranged within a box. The image sensor may in this case be a camera arranged in the box in order to detect the image of the light distribution on the screen. The evaluation device may be integrated in the box in order to perform the analysis of the detected image as described above with respect to the method. The evaluation device may further comprise an interface to communicate with external computing devices in order to perform an even more detailed analysis of the data.

According to a further aspect a computer program product is provided. The computer program product comprises code which can be saved on a memory device of the vehicle headlight analyzer as described above. The code is arranged such that the method described above can be executed by a processing device of the vehicle headlight analyzer. The processing device may be any kind of processor or microprocessor arranged to perform the analysis described above. The memory device may be any kind of device arranged to store digital data like, for example, semiconductor memory chips or optical storage devices.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 shows a perspective view of a vehicle headlight and the corresponding image of the light distribution.

FIG. 2 shows a principal sketch of a reference image of the light distribution.

FIG. 3 shows a first comparison of a good headlight with a bad headlight.

FIG. 4 shows a second comparison of a good headlight with a bad headlight.

FIG. 5 shows a principal sketch of a first embodiment of a vehicle headlight analyzer.

FIG. 6 shows a principal sketch of a second embodiment of a vehicle headlight analyzer.

FIG. 7 shows a principal sketch of a third embodiment of a vehicle headlight analyzer.

FIG. 8 shows a principal sketch of a first embodiment of the method of analyzing a light distribution of a vehicle headlight.

FIG. 9 shows the assignment of a probability within a column.

FIG. 10 shows an evaluation of an RGB sensor.

FIG. 11 shows a principal sketch of a second embodiment of the method of analyzing a light distribution of a vehicle headlight.

In the Figures, like numbers refer to like objects throughout. Objects in the Figures are not necessarily drawn to scale.

DETAILED DESCRIPTION OF EMBODIMENTS

Various embodiments of the invention will now be described by means of the Figures.

Figure 1:
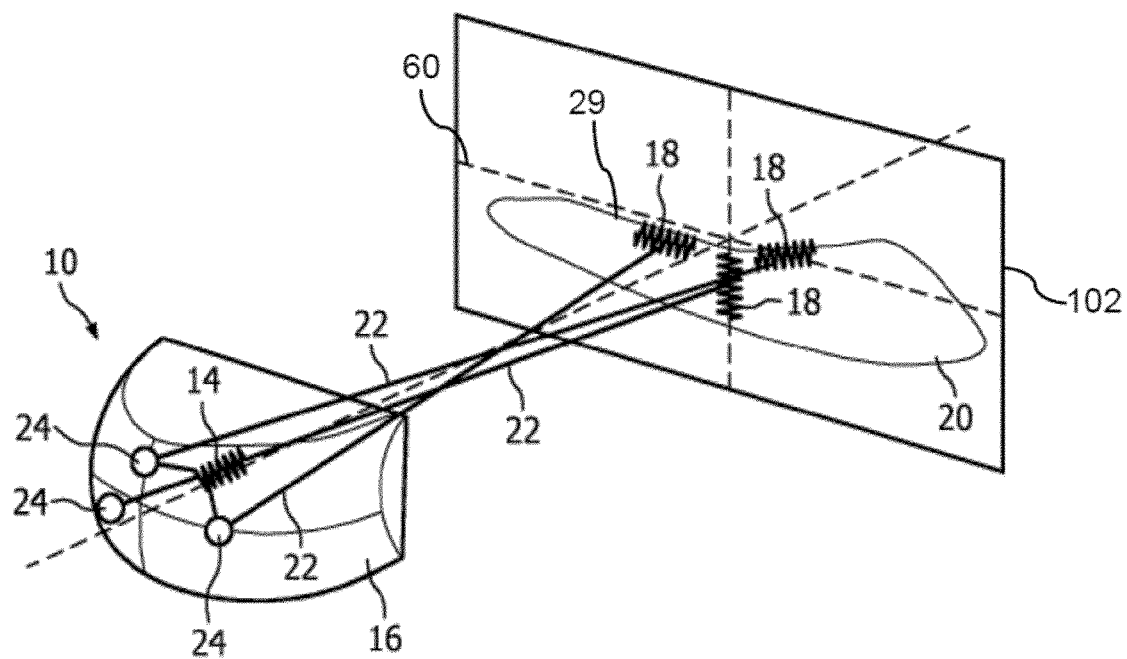

FIG. 1 shows a perspective view of a vehicle headlight 10 and the corresponding image of the light distribution 20 on a screen 102. The in this case automotive headlight 10 comprises a light source with a filament coil 14 arranged within a reflector 16 comprising several reflector segments 24. Every reflector segment 24 of the reflector 16 reflects light beams 22 of the filament coil 14 and generates an image 18 of the filament coil 14 such that an image of the light distribution 20 is provided on the screen 102. If the filament 14 is in its nominal position within the reflector 16, the cutoff line 29 is very sharp and the maximum amount of light is close to and below the cutoff line 29. If the filament 14 is displaced by more than 0.1 mm in any direction the cutoff line 29 line gets softer (fuzzy) and the amount of light is reduced significantly. In case of a filament 14 which is shifted by more than 0.4 mm the beam range can be reduced by up to 15 m. The method of analyzing the light distribution of the headlight 10 allows evaluating the quality/precision of the light source and/or the headlamp and corresponding alignment from the position and contrast of the cutoff line 29. The contrast of the cutoff line 29 means the change of brightness or intensity along a (vertical) line perpendicular to a horizon 60. The above explanation provided with respect to headlight 10 with a filament coil 14 also applies to other advanced headlights comprising a gas discharge light source or an LED-based light source in a light projection arrangement.

Figure 2:
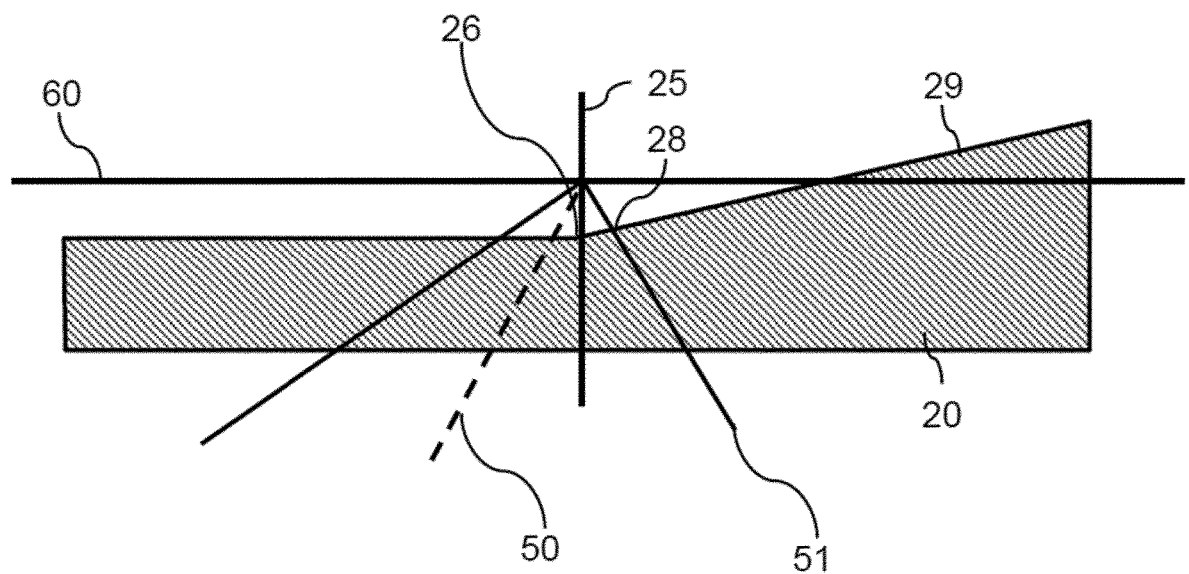

FIG. 2 shows a principal sketch of a reference image of the light distribution 20. A projection of the light distribution 20 provided by means of a headlight on a flat screen is shown. On the flat screen a straight street (or road) with the middle marking 50 and borders of the left and right lanes are shown. These three straight lines converge at one point at the horizon 60. A vertical reference line 25 crosses the horizon 60 at a right angle at this convergence point. The image of the light distribution 20 is characterized by a cutoff line 29 which comprises a first part on the left side of the vertical reference line 25 which is parallel to the horizon 60 and a second part on the right side of the vertical reference line 25 which encloses an angle with the horizon 60. The first and the second parts of the cutoff line 29 are joined by a junction point 26 which is arranged on the vertical reference line 25. The parallel first part of the cutoff line 29 on the left side characterizes a distance of 75 m in front of the vehicle. The beam range of the light distribution 20 of the headlight is given by the crossing point 28 of the border 51 of the right lane with the second part of the cutoff line 29 on the right side of the vertical reference line 25. The image of the light distribution 20 covers a horizontal angular range of −12% to +12% and a vertical angular range of −8% to +8%.

Figure 3:
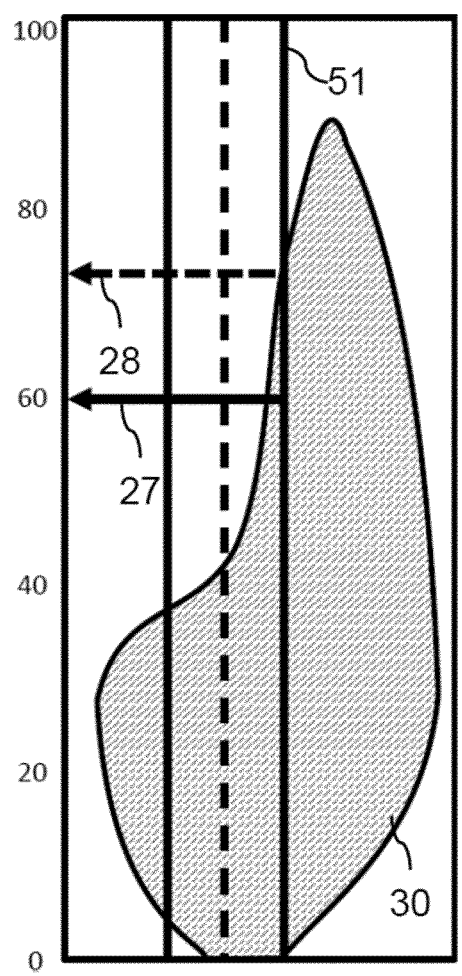
Figure 3:
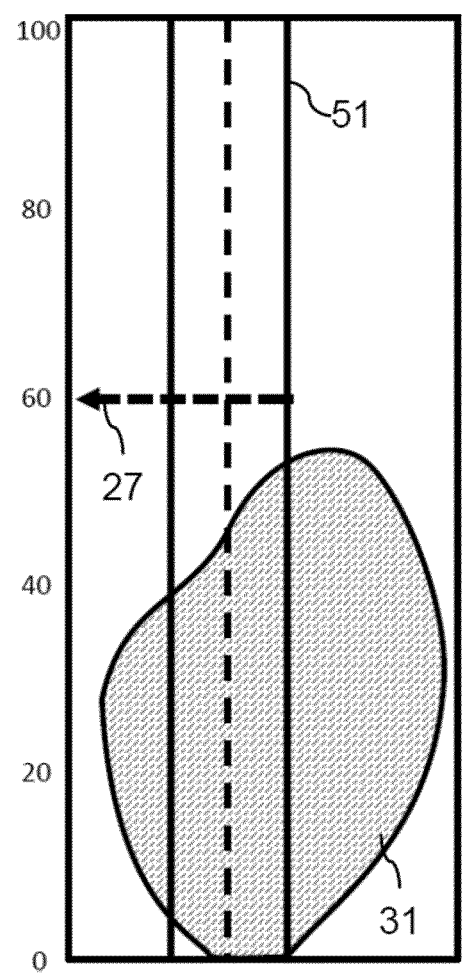

FIG. 3 shows a first comparison of a good headlight (left side) with a first bad headlight (right side). FIG. 3 shows a birds-eye-view of the light distribution on the street. The light distribution 30 of the good headlight shown on the left side of the Figure has a beam range 28 of around 75 m and exceeds the minimum beam range 27 of 60 m prescribed by the regulations. The light distribution 31 of the first bad headlight shown on the right side of the Figure shows a reduced beam range of less than 60 m. The degradation of the light distribution is in this case caused by a bad or degraded (e.g. aged) light source.

Figure 4:
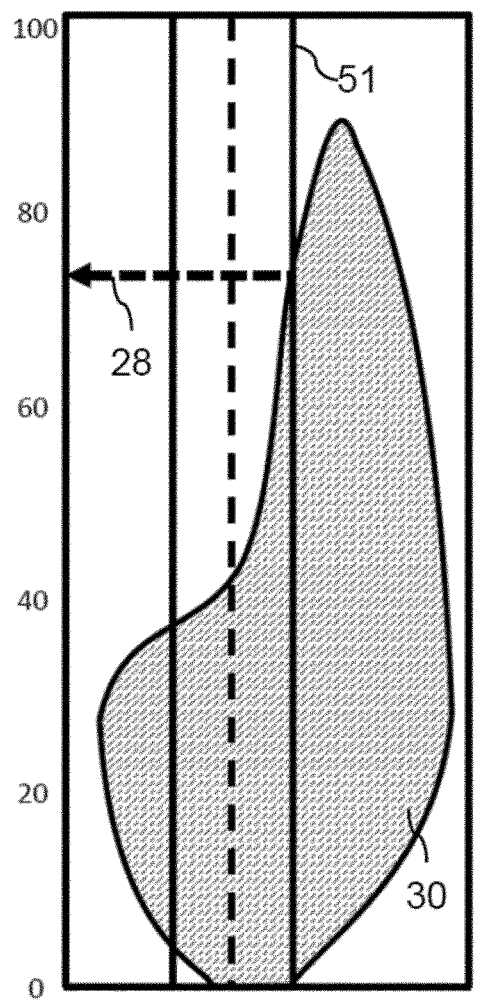
Figure 4:
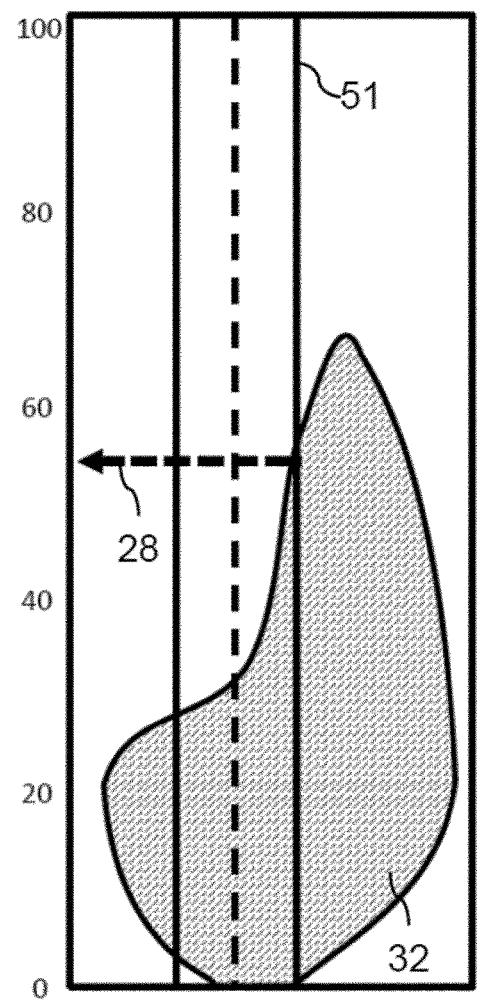

FIG. 4 shows a second comparison of a good headlight (left side) with a second bad headlight (right side). FIG. 4 shows again a birds-eye-view of the light distribution on the street. The light distribution 30 of the good headlight shown on the left side has the same beam range 28 as in FIG. 3. The light distribution 32 of the second bad headlight shown on the right side shows a reduced beam range 28 of less than 60 m. The degradation of the light distribution is in this case caused by a misalignment of the optical imaging device or the headlight comprising the optical imaging device with respect to the street. The degradation of the light distributions in the birds-eye-view shown on the right sides of FIGS. 3 and 4 is also detectable within an image of the light distributions provided by the headlight on a screen or on an image sensor as shown, for example, in FIGS. 1 and 2. The degradation of the light distributions can therefore be determined by means of an analysis of the brightness distribution of the image of the light distributions as described, for example, with respect to FIG. 8 below.

Figure 5:
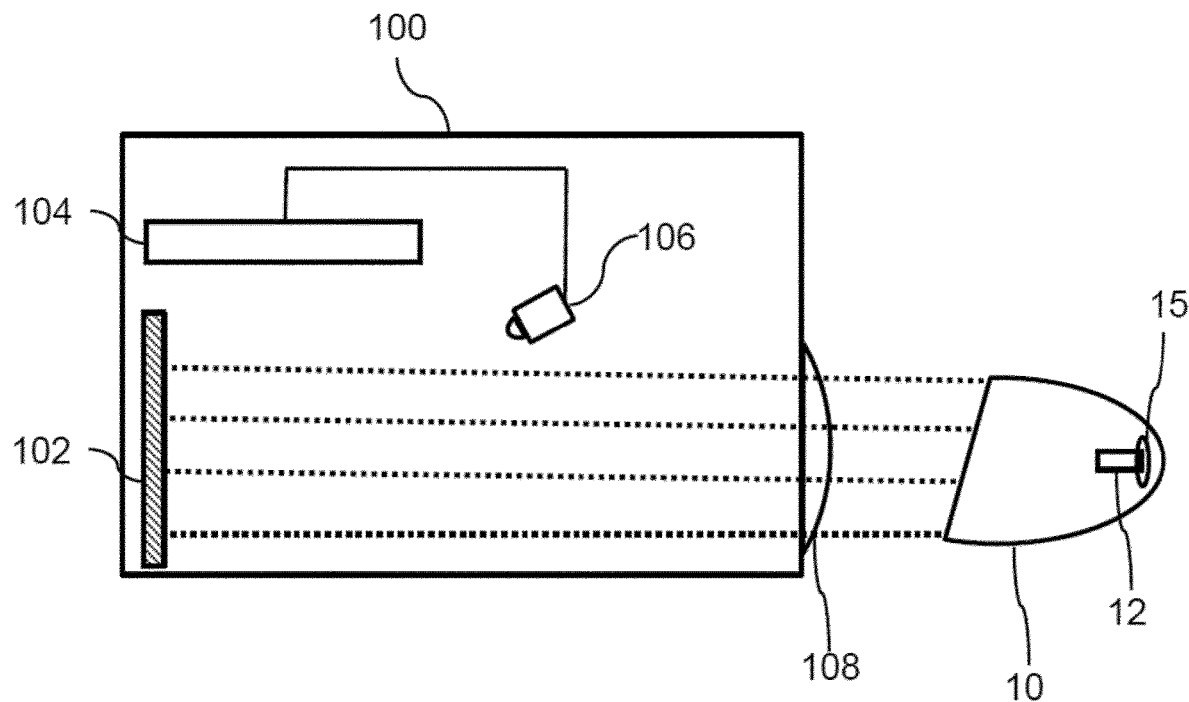

FIG. 5 shows a principal sketch of a first embodiment of a vehicle headlight analyzer 100. The vehicle headlight analyzer comprises a box with an opening in which an optical device 108 is arranged. A screen 102 is arranged within the box such that light emitted by the headlight 10 is projected on the screen 102 in order to provide an image of the light distribution of the headlight 10. An image sensor 106 is arranged within the box in order to detect the image of the light distribution on the screen 102. The image sensor 106 is in this case a digital camera. Digital image data provided by means of the digital camera is transferred to an evaluation device 104 which is in this case also within the box. The evaluation device 104 may alternatively be arranged outside the box. The evaluation device 104 may be any kind of computing device being capable to perform the method described above and especially as described with respect to following FIGS. 8-11. The evaluation device 104 is, for example, arranged to determine whether the light source 12 is degraded or old, whether there is a misalignment of the light source 12, its socket 15, or of the optical imaging device, or whether a part of the reflector or, more general, of the optical imaging device of the headlight is damaged. The results of the analysis may be presented by means of a display or any other suitable output device which can receive data provided by the evaluation device 104.

Figure 6:
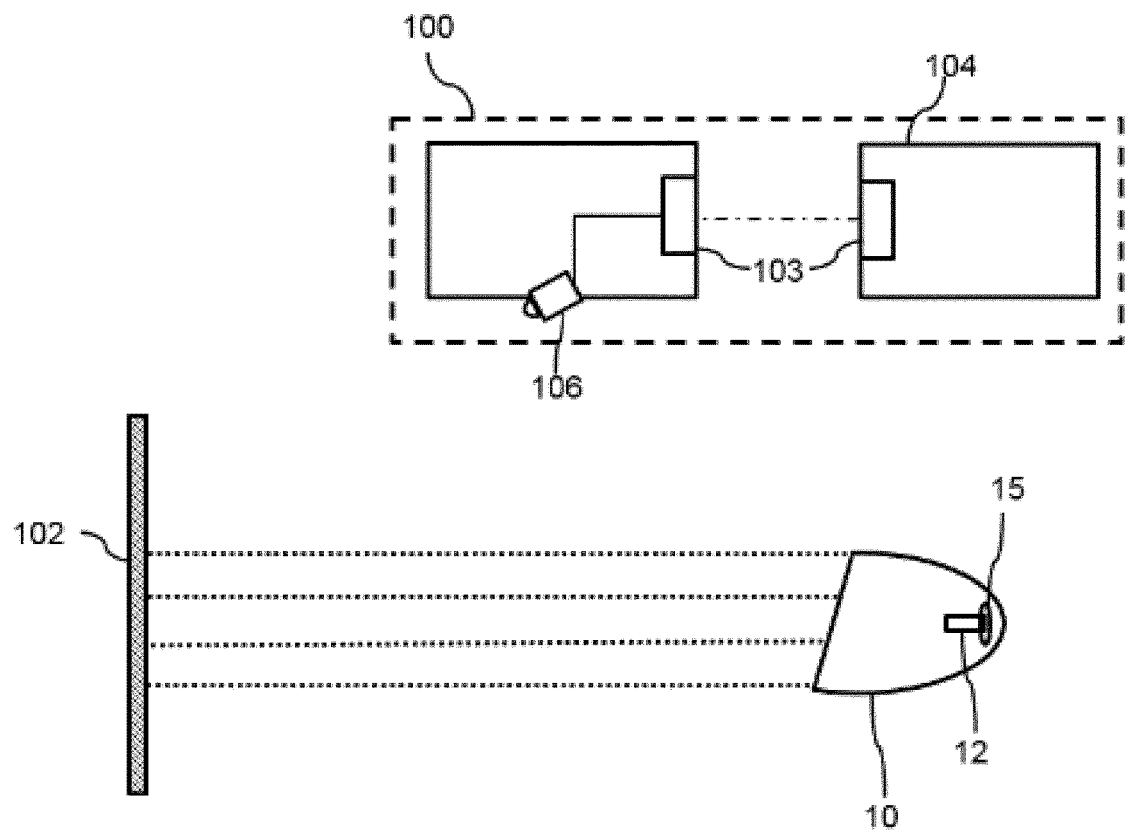

FIG. 6 shows a principal sketch of a second embodiment of a vehicle headlight analyzer 100. The vehicle headlight analyzer comprises in this case an image sensor 106 which is arranged to determine a brightness of an image of the light distribution of a vehicle headlight 10 directing a light beam to a screen 102 being located 25 m ahead of the vehicle headlight 10. The image sensor 106 is coupled to an interface 103 in order to connect the image sensor 106 to an evaluation device 104 which may be arranged at a different location. Measurement data provided by means of image sensor 106 may, for example, be submitted via the Internet to evaluation device 104. Alternatively, a part of the processing of the image data may be performed by means of, for example, a processor and a corresponding digital storage which is comprised by or assigned to the image sensor 106.

Figure 7:
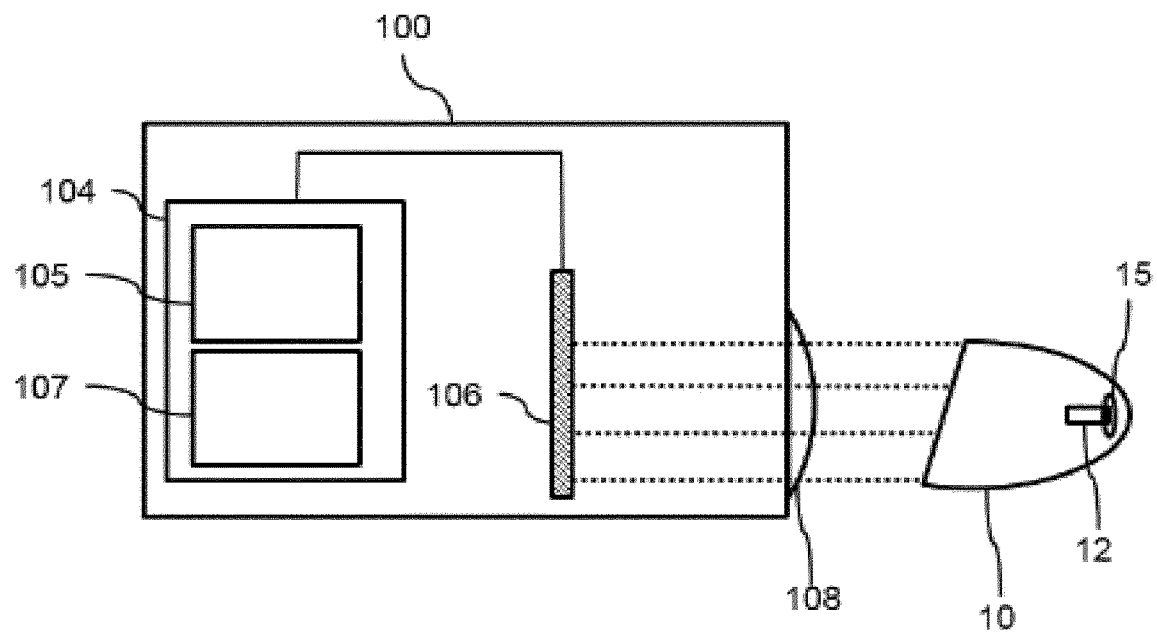

FIG. 7 shows a principal sketch of a third embodiment of a vehicle headlight analyzer 100. The general arrangement of the vehicle headlight analyzer 100 is very similar as discussed with respect to FIG. 6. Light emitted by headlight 10 is focused by means of optical device 108 to image sensor 106. The image sensor 106 is in this case an (e.g. color sensitive) charge coupled device directly receiving the light focused by the optical device 108. Measurement data provided by means of the charge coupled device 106 is transferred to the evaluation device 104 which is again arranged within a box comprising also the charge coupled device 106. The evaluation device 104 comprises one or more memory devices 105 (e.g. memory chips) and one or more processing devices 107 (e.g. microprocessors) in order to store and process the measurement data of the charge coupled device 106 as described above.

Figure 8:
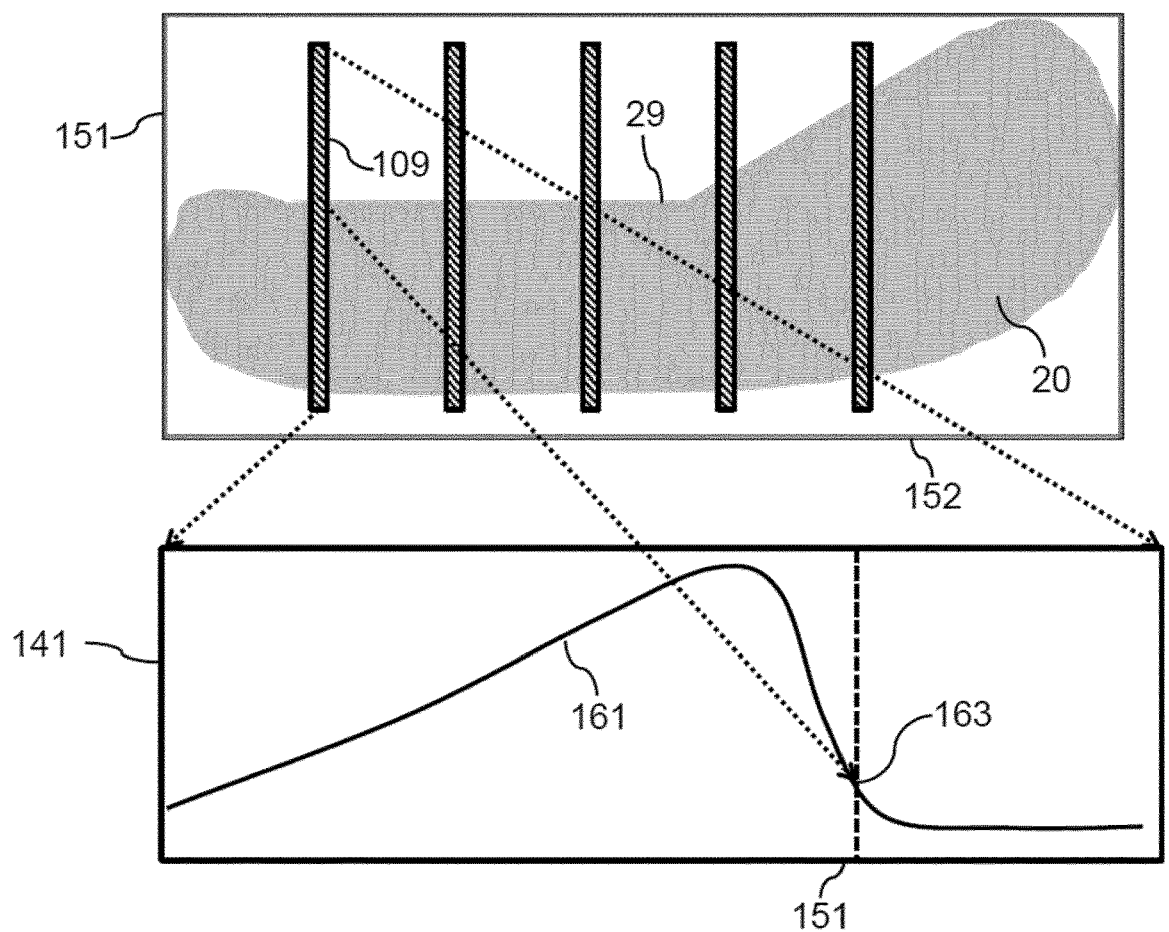

FIG. 8 shows a principal sketch of an embodiment of the method of analyzing a light distribution 20 of a vehicle headlight. The upper part of FIG. 8 shows a vertical angular range 151 of −8% to +8% and a horizontal angular range 152 of −12% to +12%. The upper part of FIG. 8 shows an image of the light distribution 20 of a headlight projected on a screen or image sensor (see FIGS. 5-7). The image sensor (not shown) which is arranged to determine the brightness or intensity of the image comprises a multitude of columns 109 which are arranged parallel with respect to each other. The columns 109 comprise a multitude of light detectors (pixels) arranged along the columns 109 which are arranged to detect the brightness of the image within a column 109 of the image and optionally the color temperature or color coordinates of the respective part of the image. The image sensor may, for example, comprise a two-dimensional array of light sensors wherein the columns of the array are assigned to the columns. The light detectors comprised by the image sensor are calibrated with respect to each other such that each light detector (or light sensor) provides essentially the same signal level at a given brightness. Furthermore, a calibration of the light detectors with respect to absolute brightness is performed by means of a reference or calibration light source in order to provide reliable measurement data. Finally, a calibration with respect to color temperature may be performed by using reference light sources emitting light in a narrow wavelength range, for example, in the red, green and/or blue wavelength range. The image sensor may comprise at least 50 columns 109 within the horizontal angular range 152 defined above, preferably at least 100 columns and most preferably at least 200. The image sensor may, for example, be a semiconductor-based sensor of a high definition digital camera which is preferably arranged to record colored pictures.

The lower part of FIG. 8 shows an intensity distribution 161 along a column 109 of the image sensor. The ordinate is assigned to the intensity 141 and the abscissa is assigned to the vertical angular range 151 covered by one column 109. The upper part of the column 109 corresponds to the right side of the intensity distribution 161 (indicated by an arrow). The lower part of the column 109 corresponds to the left side of the intensity distribution 161 also indicated by an arrow. Each sensor of column 109 provides one measurement point of the intensity distribution 161. In the upper part of column 109 (glare zone) there is essentially no light detected. Going down, respectively leftwards in intensity distribution 161, the detected brightness increases as soon as light distribution 20 is entered. The intensity (going down in column 109) increases fast, reaches a maximum and decreases slowly after the maximum. The brightness detected by means of each light sensor or pixel is compared with the brightness detected by at least one neighboring sensor or pixel.

Figure 9:
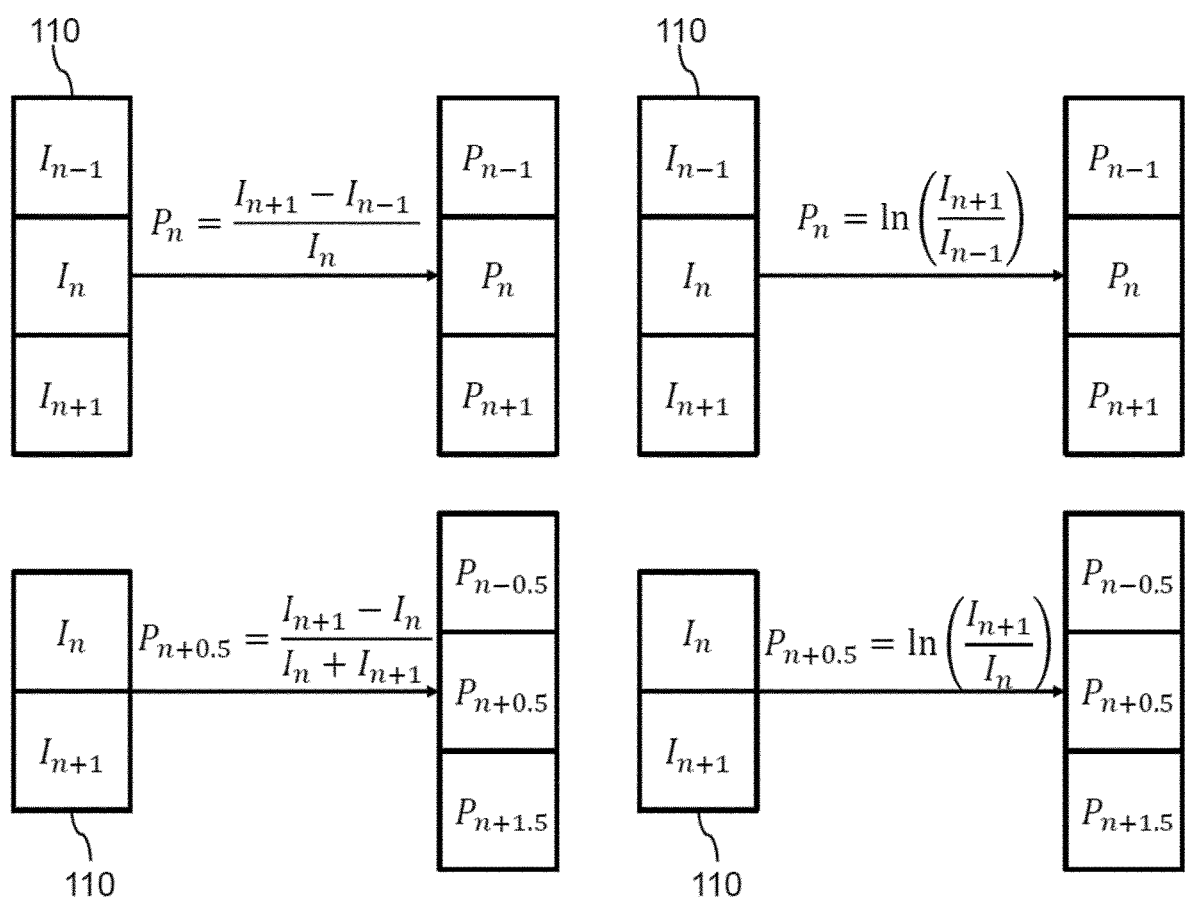

FIG. 9 shows examples of the assignment of a probability of a cutoff to one or more of neighboring pixels 110 within a column 109. The measured intensities recorded of neighboring pixels 110 are compared in order to determine a relative change of intensity between neighboring pixels. The upper left corner of FIG. 9 shows three pixels 110 of column 109 and corresponding measured intensities $I_{n-1}, I_n, I_{n+1}$. A probability of a cutoff is calculated by the equation $$P_n = \frac{I_{n+1} - I_{n-1}}{I_n}.$$

The probability $P_n$ is assigned to pixel n of the corresponding column as indicated by the corresponding arrow.

The upper right corner of FIG. 9 shows a similar arrangement in which a probability of a cutoff is calculated by the equation $$P_n = \log\left(\frac{I_{n+1}}{I_{n-1}}\right).$$

Again, the probability $P_n$ is assigned to pixel n of the corresponding column.

The lower left corner of FIG. 9 shows an arrangement with two pixels 110 and corresponding intensities $I_n, I_{n+1}$ in which a probability of a cutoff is calculated by the equation $$P_{n+0.5} = \frac{I_{n+1} - I_n}{I_n + I_{n+1}}.$$

The probability $P_n$ is assigned to a "fictitious" pixel $P_{n+0.5}$ "in-between" pixels n and n+1 of the corresponding column. Such assignment of probabilities has the effect that there is one additional probability value per column in comparison to the number of pixels 110 in the respective column.

The lower right corner of FIG. 9 is very similar to the lower left corner discussed above. The probability of the cutoff is in this case calculated by the equation $$P_{n+0.5} = \log\left(\frac{I_{n+1}}{I_n}\right).$$

The assigned probability is taken as a measure of a probability of a cutoff 163 being part of a cutoff line 29 as shown in FIG. 8. The higher the relative brightness difference is the higher is the probability that a cutoff 163 is located at that point. Performing this method for a multitude of columns 109 and taking into account the probability distribution of the cutoff 163 within each column 109 enables reliable determination of cutoff line 29 and of the brightness gradient around cutoff line 29 in each column 109. The method therefore enables a local analysis of the light distribution 20 of the headlight by means of its image such that problems caused by the light source, the optical imaging device or the relative arrangement of the light source with respect to the optical imaging device can be detected as described.

Figure 10:
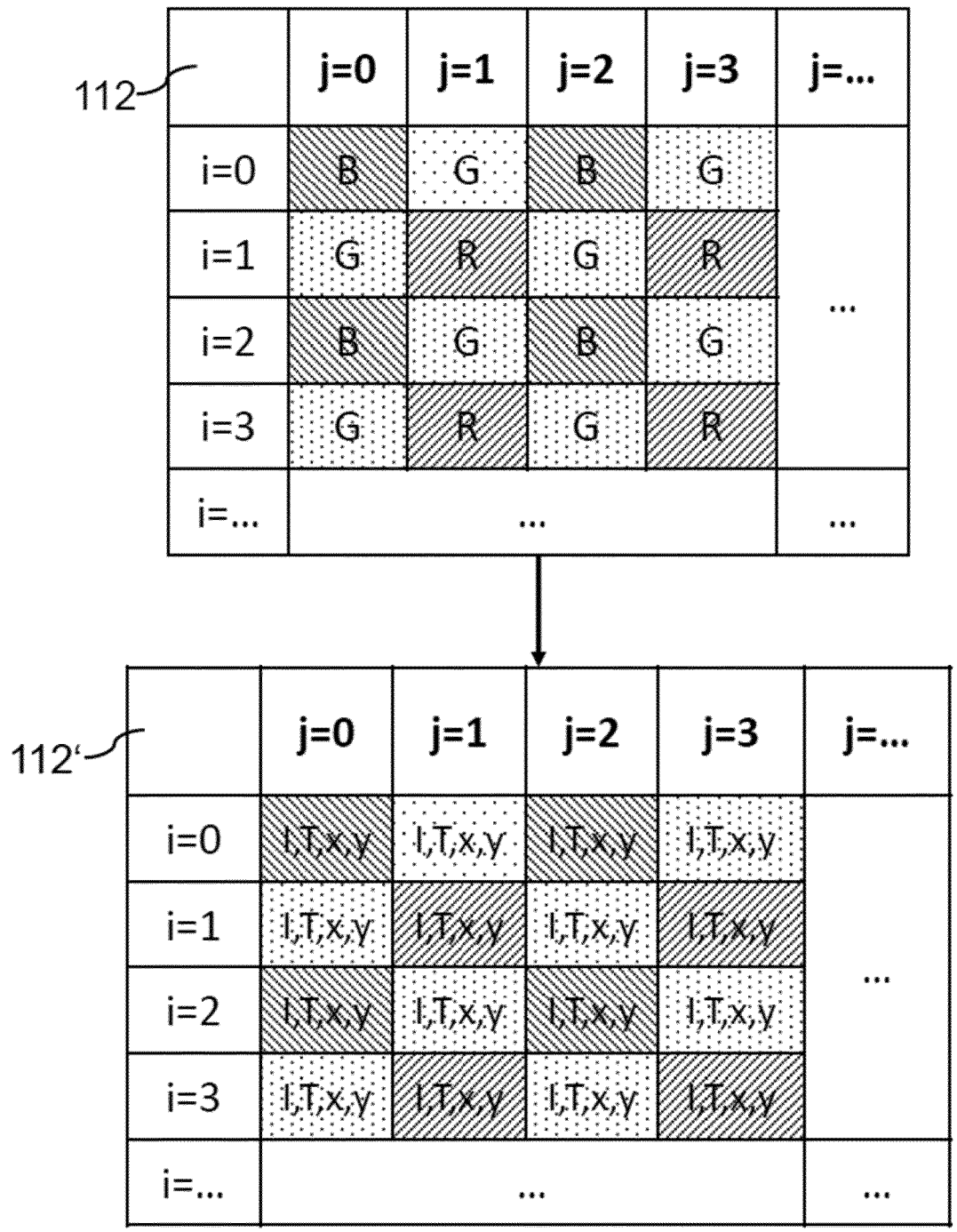

FIG. 10 shows an evaluation of an RGB sensor comprising a two-dimensional array of sensors which are sensitive in the blue (B), green (G) and red (R) wavelength ranges. The indices 112 of the RGB array are j for the columns and i for the rows. In the first column j=0 blue sensors (B) and green sensors (G) are arranged in an alternating order. In the second column j=1 green sensors (G) and red sensors (R) are arranged in an alternating order. The arrangement of the first and the second column is repeated in the third and fourth column and so on in order to provide a regular pattern of RGB sensors. The measurement data provided by means of the single color sensors can be used to calculate the luminous intensity I, the color temperature T and the color coordinates x, y. Each pixel of the RGB array can be assigned by means of bijective transformations to a corresponding luminous intensity as discussed with respect to FIG. 9 as well as to a color temperature and/or to a color coordinate as indicated in the lower part of FIG. 10 in which a derived array of light characteristics with indices 112' is shown. Absolute values or relative changes (see examples of FIG. 9) of the color temperature and/or the color coordinates may be used in addition to the intensity values to determine the lighting mode (e.g. low beam, high beam . . . ). Furthermore, the luminous intensities and/or the additional information about the color temperature and/or color coordinates may be used to determine the type of light source (halogen, Xenon, LED, laser or the like), the product type, type of headlight (e.g. projection, reflection or the like) and, depending on the type of light source, the age of the respective light source. The determination may be performed in an automated way by comparing the measured data and/or processed measured data with reference data. The maximum intensity, the color temperature, glare of oncoming traffic, type of headlight (halogen, Xenon, LED—reflection/projection) may be determined in order to select the corresponding reference image of light distribution 20 and corresponding reference cutoff line because the reference cutoff line depends, for example, on the type of headlight and/or type of light source. The color temperature may, for example, be used in a Xenon headlight to determine the age of the Xenon light source because the color temperature decreases with lifetime.

The method may further comprise the combination of the analysis of both headlights such that a realistic two dimensional or three dimensional visualization of the light distribution of both headlights can be provided (see, for example, FIGS. 3 and 4 above with respect to a two dimensional visualization).

Figure 11:
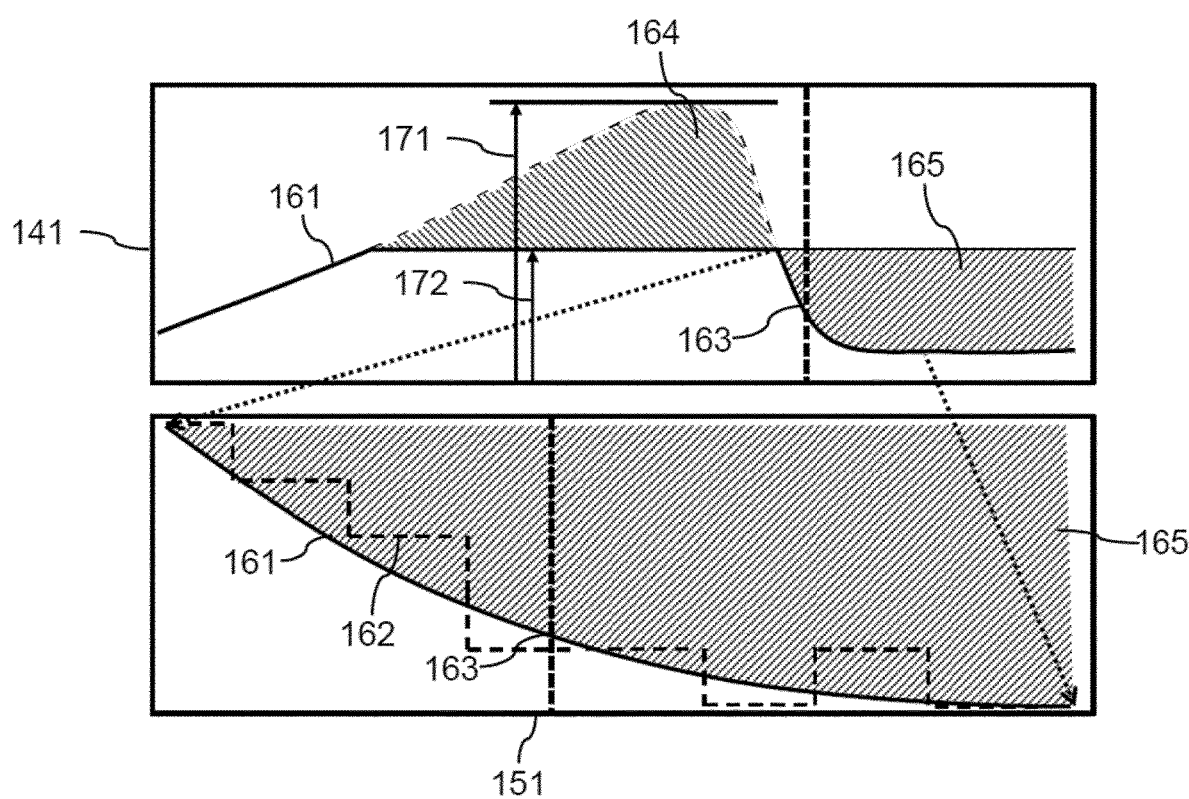

FIG. 11 shows a principal sketch of a second embodiment of the method of analyzing a light distribution of a vehicle headlight. The second embodiment is preferably combined with the first embodiment discussed with respect to FIG. 8. The upper part of FIG. 11 shows as well as the lower part of FIG. 8 an intensity distribution 161 along a column (not shown) of an image sensor. The ordinate is assigned to the intensity 141 and the abscissa is assigned to the vertical angular range 151 covered by one column. The method according to the second embodiment uses at least two pictures with different dynamic range. A first picture is taken in which the maximum dynamic range 171 with respect to the brightness or intensity of the light source is recorded. That means that no sensor or pixel is saturated by means of the maximum intensity received from the headlight as indicated by the high-intensity range 164. Taking the whole dynamic range of the headlight does have the effect that the brightness or intensity resolution of pixels in the low intensity region 165 is low. A second picture is taken covering the dynamic range 172 of lower intensities (including the glare zone). That means that sensors receiving light in the high-intensity range 164 are saturated as indicated by the flat part of the intensity line 161. Resolution of the pixels in the glare region 165 is increased because, for example, now 100 lux are covered by means of an 8-bit resolution which before had to cover e.g. 200 lux. This is shown in the lower part of FIG. 11 showing a magnification of the glare zone 165 as indicated by the arrows. The magnification of the glare zone 165 comprises the point of the intensity distribution 161 at which the cutoff 163 is located with the highest probability. Accuracy of the determination of the cutoff 163 may therefore be increased. The dynamic range of the pictures may, for example, be controlled by means of a short or long period of exposure of the pixels of the image sensor.

Two, three, four or more pictures with different dynamic ranges may be used in order to improve the accuracy. Using pictures with different dynamic range may further be used to determine a color temperature and/or color coordinates as discussed with respect to FIG. 10. Line 162 in FIG. 11 shows the measured discrete (digital) intensities which are used to determine intensity curve 161 along one column of the image sensor.

Precision of the detected light distribution enables a reliable simulation of the corresponding two dimensional or three dimensional light distribution as discussed above.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 10 headlight
12 light source
14 filament coil
15 socket
16 reflector
18 images of filament coil
20 light distribution
22 reflected light beams
24 reflector segments
25 vertical reference line
26 junction point
27 minimum beam range according to regulations
28 beam range
29 cutoff line
30 light distribution on street of good headlight
31 light distribution on street of first bad headlight
32 light distribution on street of second bad headlight
50 middle marking of street
51 border of right lane
60 horizon
100 vehicle headlight analyzer
102 screen
103 interface
104 evaluation device
105 memory device
106 image sensor
107 processing device
108 optical device
109 column of image
110 pixel
112 indices of RGB array
112' indices of derived array of light characteristics
141 intensity
151 vertical angular range
152 horizontal angular range
161 intensity along column of image sensor
162 measured discrete (digital) intensity
163 cutoff
164 high intensity range
165 low intensity range (glare range)
171 dynamic range covering maximum intensity
172 dynamic range covering low intensities, i.e., covering intensities of glare region

The invention claimed is:

1. A method of analyzing a light distribution of a vehicle headlight, the vehicle headlight comprising an optical imaging device, the method comprising the steps of:
   detecting an image of the light distribution,
   determining a brightness of at least a part of pixels of the image within a multitude of columns of the image, the columns being perpendicular to a horizon in the image,
   determining a probability of a cutoff within each of the multitude of columns based on a relative change of brightness between neighboring pixels of the image within the columns, wherein the probability is the higher the higher the relative change of brightness is,
   determining a cutoff line based on the probability of the cutoff within the multitude of columns of the image,
   comparing the cutoff line with a reference cutoff line,
   determining a quality of the light distribution characterized by the cutoff line by means of the comparison, and
   determining by global or local deviations of the cutoff line from the reference cutoff line whether a reduction in quality of the light distribution is caused by a light source of the vehicle headlight, or the optical imaging device of the vehicle headlight, or a relative position of the light source with respect to the optical imaging device.

2. The method according to claim 1, wherein the method comprises the further step of:
   assigning the probability of the cutoff to at least one of the neighboring pixels.

3. The method according to claim 1, wherein the method comprises the further steps of:
   determining a first part of the cutoff line being parallel to the horizon,
   determining a second part of the cutoff line enclosing an angle with the horizon, and
   determining a junction point wherein the first part of the cutoff line and the second part of the cutoff line touch each other.

4. The method according to claim 1, the method comprising the further step of:
   detecting the image of the light distribution on a screen in a horizontal angular range of at least 2% on either side of a vertical reference line.

5. The method according to claim 1, comprising the further step of:
   determining a light distribution on a street based on the image of the light distribution.

6. The method according to claim 1, comprising the further step of:
   determining a three-dimensional light distribution on the street simulating a driver perspective of a driver of a vehicle comprising the vehicle headlight based on the image of the light distribution.

7. The method according to claim 1, comprising the further step of:
   presenting alternative configurations of the vehicle headlight with an improved light distribution, wherein the alternative configurations are chosen out of the group of selecting an alternative light source of the vehicle headlight, an alternative positioning of the vehicle headlight, an alternative positioning of the light source of the vehicle headlight, an alternative optical imaging device of the vehicle headlight, and combinations thereof.

8. The method according to claim 1, comprising the further steps of:
   determining a color temperature or color coordinates for at least the part of pixels of the image within the multitude of columns of the image, and
   using the color temperature or color coordinates for determining at least one of a lighting mode of the vehicle headlight, a type of the light source of the vehicle headlight, and an age of the light source of the vehicle headlight.

9. The method according to claim 8, the method using the color temperature or color coordinates for determining the type of the light source of the vehicle headlight, and the method comprising the further step of:

selecting the reference cutoff line in dependence on the determined type of the light source of the vehicle headlight.

10. A vehicle headlight analyzer comprising:
an image sensor being arranged to detect an image of a light distribution of a vehicle headlight, the vehicle headlight comprising an optical imaging device, and
an evaluation device,
the evaluation device being adapted for
determining a brightness of at least a part of pixels of the image within a multitude of columns of the image, the columns being perpendicular to a horizon in the image,
determining a probability of a cutoff within each of the multitude of columns based on a relative change of brightness between neighboring pixels of the image within the columns, wherein the probability is the higher the higher the relative change of brightness is,
determining a cutoff line based on the probability of the cutoff within the multitude of columns of the image,
comparing the cutoff line with a reference cutoff line,
determining a quality of the light distribution characterized by the cutoff line by means of the comparison, and
determining by global or local deviations of the cutoff line from the reference cutoff line whether a reduction in quality of the light distribution is caused by a light source of the vehicle headlight, or the optical imaging device of the vehicle headlight, or a relative position of the light source with respect to the optical imaging device.

11. The vehicle headlight analyzer according to claim 10, further comprising an optical device, wherein the optical device is adapted to project the image on the image sensor.

12. The vehicle headlight analyzer according to claim 10, further comprising a screen on which the image of the light distribution is projected, wherein the image sensor is adapted to detect the image on the screen.

13. The vehicle headlight analyzer according to claim 12, further comprising an optical device, wherein the optical device is adapted to project the image on the screen.

14. A computer program product comprising code which can be saved on a memory device of the vehicle headlight analyzer according to claim 10, wherein the code is arranged such that the method according to claim 1 can be executed by a processing device of the vehicle headlight analyzer according to claim 10.

* * * * *